United States Patent [19]

Hitzky

[11] Patent Number: 4,503,898

[45] Date of Patent: Mar. 12, 1985

[54] PNEUMATIC TIRE

[75] Inventor: Leo J. Hitzky, Walferdange, Luxembourg

[73] Assignee: The Goodyear Tire & Rubber Company, Akron, Ohio

[21] Appl. No.: 531,878

[22] Filed: Sep. 14, 1983

[51] Int. Cl.³ .............................................. B60C 11/10
[52] U.S. Cl. ................................................. 152/209 R
[58] Field of Search ....................... 152/209 R, 209 D; D12/140

[56] References Cited

U.S. PATENT DOCUMENTS 2,006,197 6/1935 Ewart et al. .................... 152/209 R
4,327,792 5/1982 Landers .......................... 152/209 R Primary Examiner—Michael Ball
Attorney, Agent, or Firm—Frank Pincelli

[57] ABSTRACT

A pneumatic tire having a tread portion comprising a plurality of repeating design cycles disposed circumferentially adjacent each other about the circumference of said tire. The repeating design cycles having at least eight different lengths and being disposed about the circumference of the tire such that at least sixty percent (60%) of all the design cycles having the same length are disposed circumferentially adjacent each other.

8 Claims, 5 Drawing Figures

PNEUMATIC TIRE

The foregoing abstract is not to be taken as limiting the invention of this application, and in order to understand the full nature and extent of the technical nature of this application, reference must be made to the accompanying drawings and the following detailed description.

BACKGROUND OF THE INVENTION

This invention relates to tires, and more particularly to an improved pitching sequence for the tread portion of a tire.

The tread portion of a tire comprises a plurality of design cycles placed continuously about the circumference of the tire. For any particular tread pattern, a certain amount of energy is produced in the form of sound, which can take the form of a harsh and disagreeable noise. Various methods have been suggested in the prior art to reduce objectionable noise generated by tires by spreading the energy produced over the frequency spectrum. The primary method used is to modulate the length of the repeating design cycle by varying the length of the design cycle about the circumference of the tire. This is generally known in the prior art as pitching. Generally three different design cycle lengths are arranged in some sequential order about the circumference of the tire. However, the pitching of the design cycles can itself cause objectionable noise.

The objectionable noise generated by tires of the prior art resides generally in either the loudness, i.e. decibel level, or tonality, the concentration of too much energy into anyone particular frequency. This becomes of even more importance in tires having aggressive tread patterns, for example tires primarily designed to be used as a snow tire or in all weather conditions.

Applicants have developed a novel pitching arrangement whereby the decibel level and tonality of the tire is reduced. For the purposes of this invention, tonality is the condition wherein the sound generated by the tread portion of the tire is dominated by a single frequency and its harmonics, that is, the majority of the sound generated being concentrated into a very small frequency range of the sound spectrum.

DETAILED DESCRIPTION OF THE INVENTION

Figure 1:
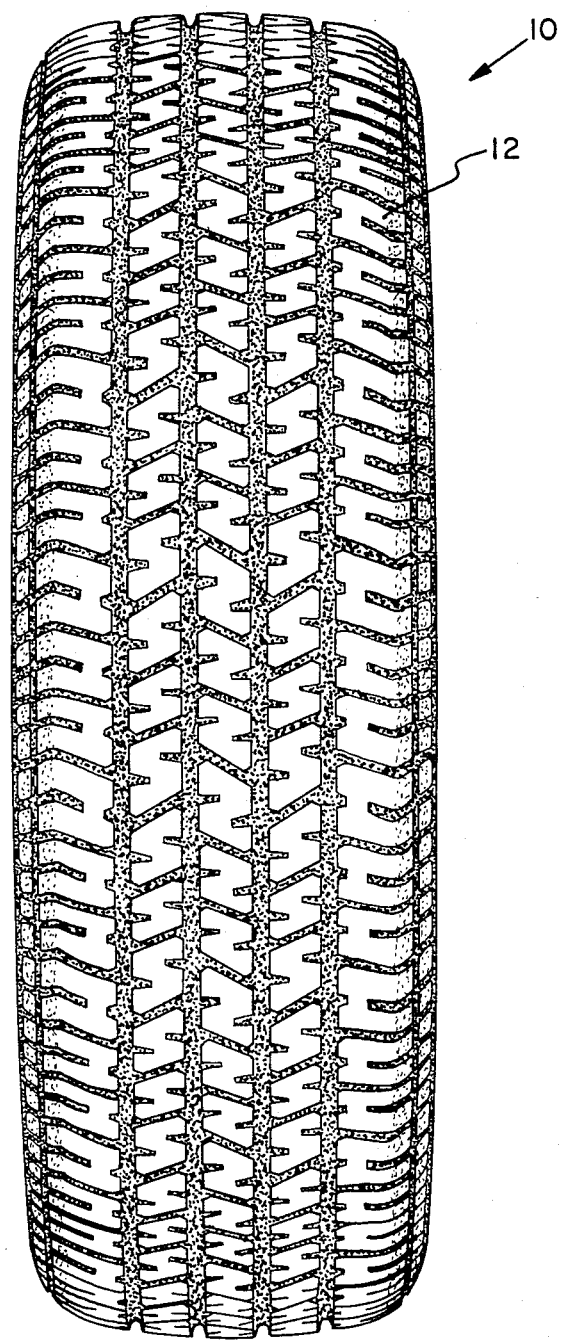
FIG. 1 is a perspective view of a tire having a tread made in accordance with the present invention.
Figure 2:
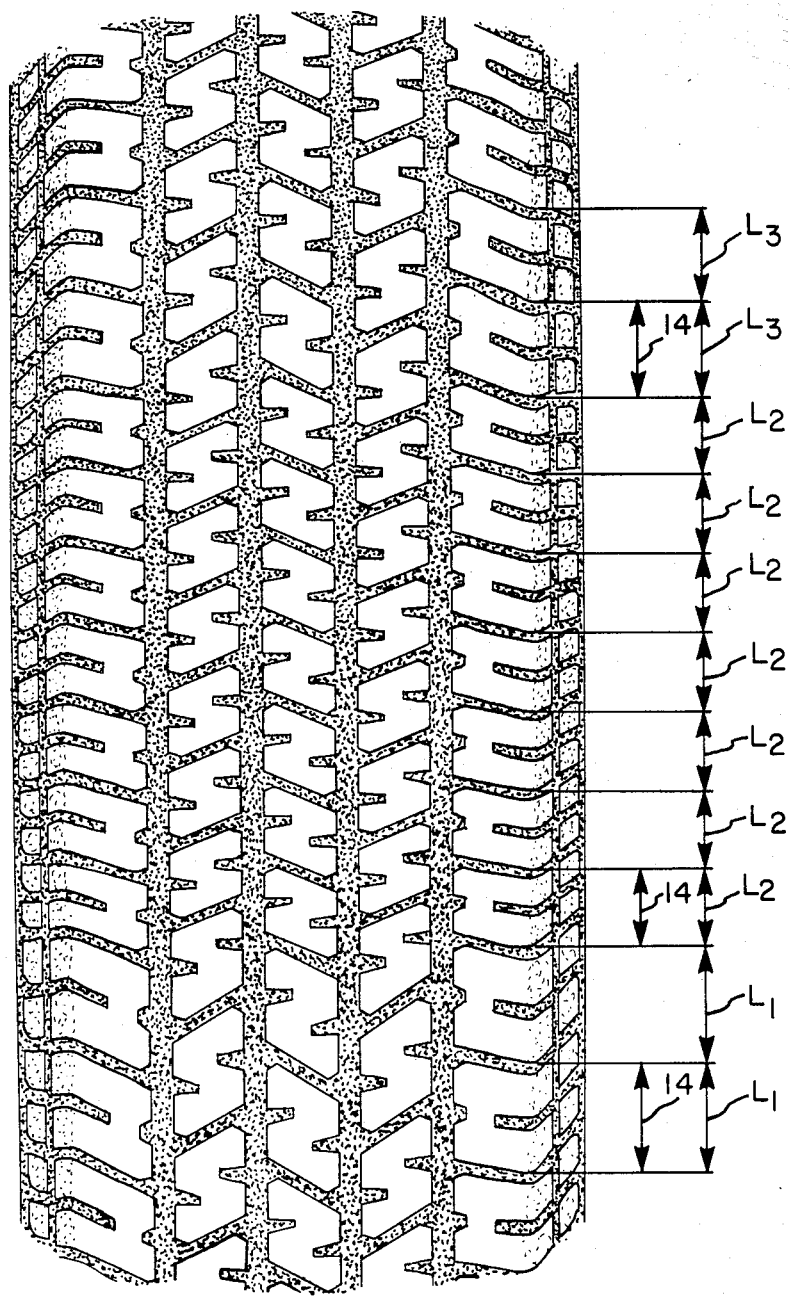
FIG. 2 is an enlarged plan view illustrating the tread portion of FIG. 1.

Referring to FIGS. 1 and 2, there is illustrated a pneumatic tire 10 having a ground engaging tread portion 12 made in accordance with the present invention. The tread portion 12 extends circumferentially about the tire 10 and is divided up into a plurality of repeating design cycles 14 disposed adjacent each other. The repeating pattern may be any pattern so desired and is not limited to the particular design illustrated. The length of each design cycle is commonly referred to as its "pitch length". The present invention is provided with a plurality of different design cycle lengths, that is, a plurality of different pitch lengths. The particular arrangement of these different pitch lengths about the circumference of the tire is the "pitch sequence" of the tire. In the particular embodiment illustrated, the tire 10 is a passenger tire having a size of P185/70R14 which refers to the fact that the subject tire is a passenger tire having a 70% aspect ratio, a nominal rim diameter of 14 inches and a tire section width of 185 mm.

Figure 3:
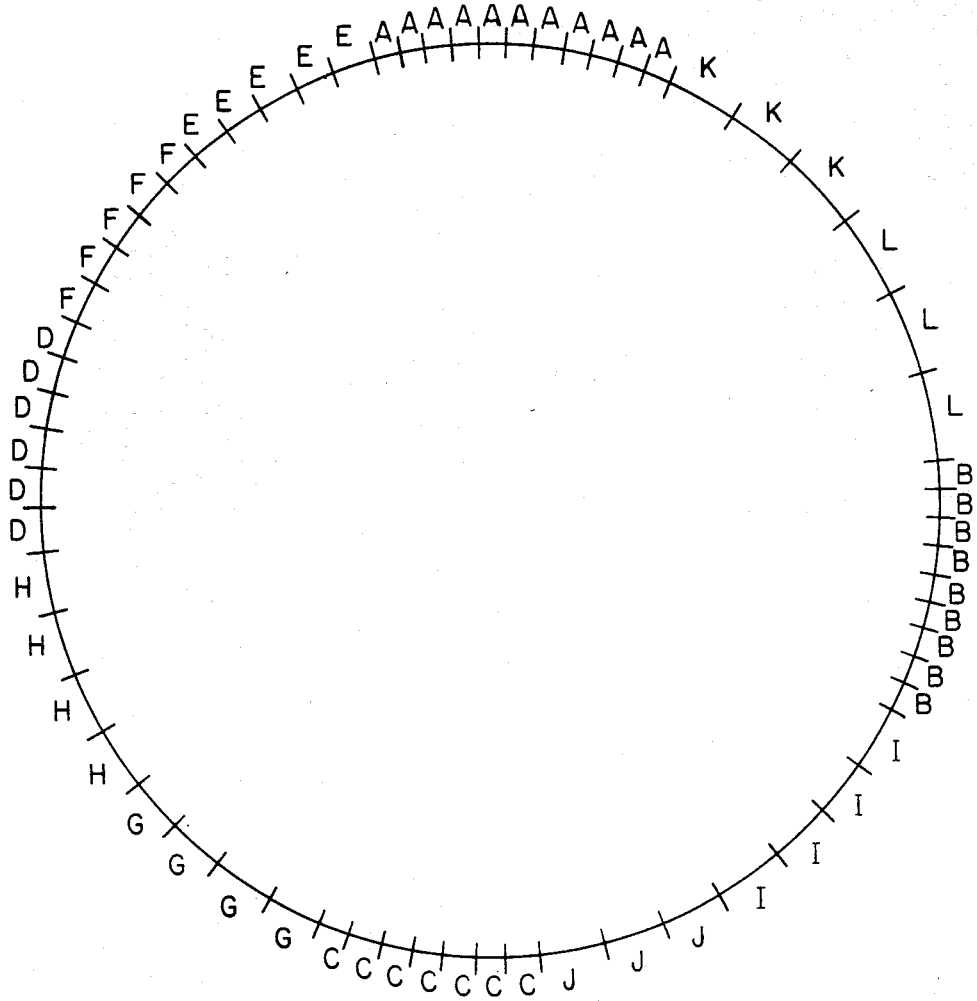
FIG. 3 is a schematical representation of the pitching sequence of the tire of FIG. 1.

The tire 10 may have any number of pitches, preferably from about 40 to 80 pitches for a passenger tire. In the particular embodiment illustrated, the tire 10 is provided with 64 pitches (design cycles). There should be at least eight (8) different pitch lengths, preferably at least 10. In the particular embodiment illustrated, there is provided twelve (12) different pitch lengths. While there may be as many different pitch lengths as there are pitches, which is the most preferred form of the invention, the greater the number of different pitch lengths used, the smaller the difference in the length between the pitches, until the difference becomes very small and impractical to produce. The pitches are arranged in groups about the circumference of the tire such that a majority of all the pitches (design cycles) having the same length are placed adjacent each other. Generally, at least 60% of all pitches having substantially the same length are disposed adjacent each other, preferably at least 80%. In the most preferred form of the present invention, all pitches having the same length are disposed adjacent each other. In the particular embodiment illustrated, the 12 different pitch lengths are represented by the first 12 letters of the alphabet wherein A is the smallest and L is the largest, the remaining letters increase progressively in size therebetween. Referring to FIG. 3, there is illustrated a pitch sequence for the circumference of the tire 10 wherein each letter represents a single pitch length. This sequence in FIG. 3 is as follows:

AAAAAAAAAAAKKKLLLBBBBBBB-
BBIIIIJJJCCCCCCCCGGGGHHHHDDDDDD
FFFFFEEEEE

As can be seen, this sequence is such that all the pitches having the same pitch length are grouped together; that is, adjacent each other. While the sequence of the group of pitches having the same length may be in any order desired, preferably they are mixed up so that the group of pitches having the smallest pitch length are near or adjacent the group of pitches having the largest length. For example; smallest, largest, second smallest, second largest, third smallest, third largest until all sizes are accounted for. However, due to manufacturing constraints, this sequence can be approximated as illustrated above in the actual sequence for tire 10 which can be described as:

(1) Smallest, (2) Second largest, (3) Largest, (4) Second smallest, (5) Third largest, (6) Fourth Largest, (7) Third smallest, ... until all the pitch lengths have been accounted for. In the embodiment illustrated, there are 12 different pitch lengths. However, there may be as many different pitch lengths as there are pitches in the subject tire. The important aspect of the present invention is that the pitches be arranged in the particular sequence such that substantially all the pitches having the same pitch length are disposed adjacent each other.

In the practice of the subject invention, the ratio of the largest pitch length to that of the smallest pitch length should be less than 2, preferably between 1.2 and 1.8.

Figure 4:
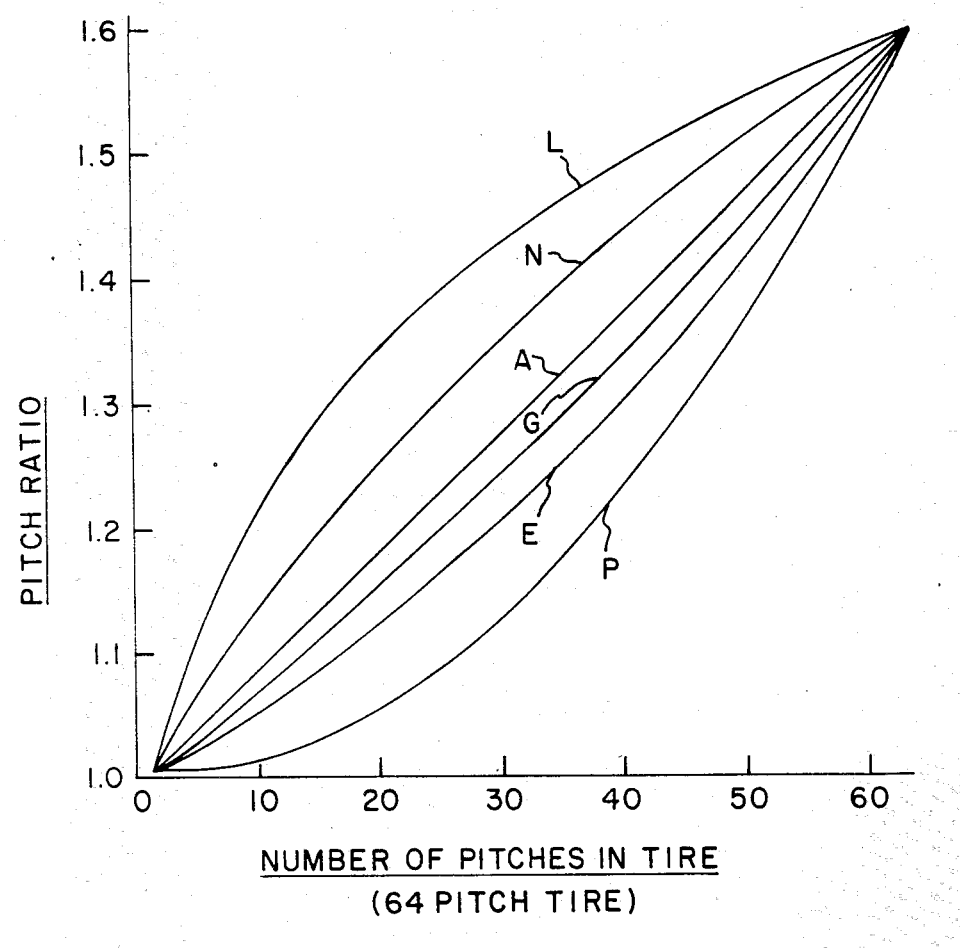
FIG. 4 illustrates the graphical representation of six different mathematical equations relating pitch ratio versus number of pitches in a tire.

In order to further minimize the decibel level and tonality of the tire, applicants have found that the circumferential length L of each different pitch length substantially follow a specified mathematical relationship. Referring to FIG. 4, there is illustrated a graphical representation of 6 mathematical relationships which relate pitch ratio to the number of pitches in tire.

$$V_i = V_1 + \text{Log}\left[1 + (10 - 1) \cdot \frac{i-1}{N-1}\right] \cdot (V_N - V_1) \quad \text{curve L}$$

$$V_i = V_1 + \text{Ln}\left[1 + (e - 1) \cdot \frac{i-1}{N-1}\right] \cdot (V_N - V_1) \quad \text{curve N}$$

$$V_i = V_1 + \frac{i-1}{N-1} \cdot (V_N - V_1) \quad \text{curve A}$$

$$V_i = V_1 \left(\frac{V_N}{V_1}\right)^{\frac{i-1}{N-1}} \quad \text{curve G}$$

$$V_i = V_1 + \frac{e^{\frac{i-1}{N-1}} - 1}{e - 1} \cdot (V_N - V_1) \quad \text{curve E}$$

$$V_i = V_1 + \left(\frac{i-1}{N-1}\right)^2 \cdot (V_N - V_1) \quad \text{curve P}$$

Each line represents a different mathematical progression.

Wherein $V_1$ is the smallest pitch ratio;
$V_N$ is the largest pitch ratio;
N equals the number of pitches in the tire;
$V_i$ is the pitch ratio of each of the pitches that have to be determined, the subscript i indicating which pitch of the total number of pitches is being determined.

Figure 5:
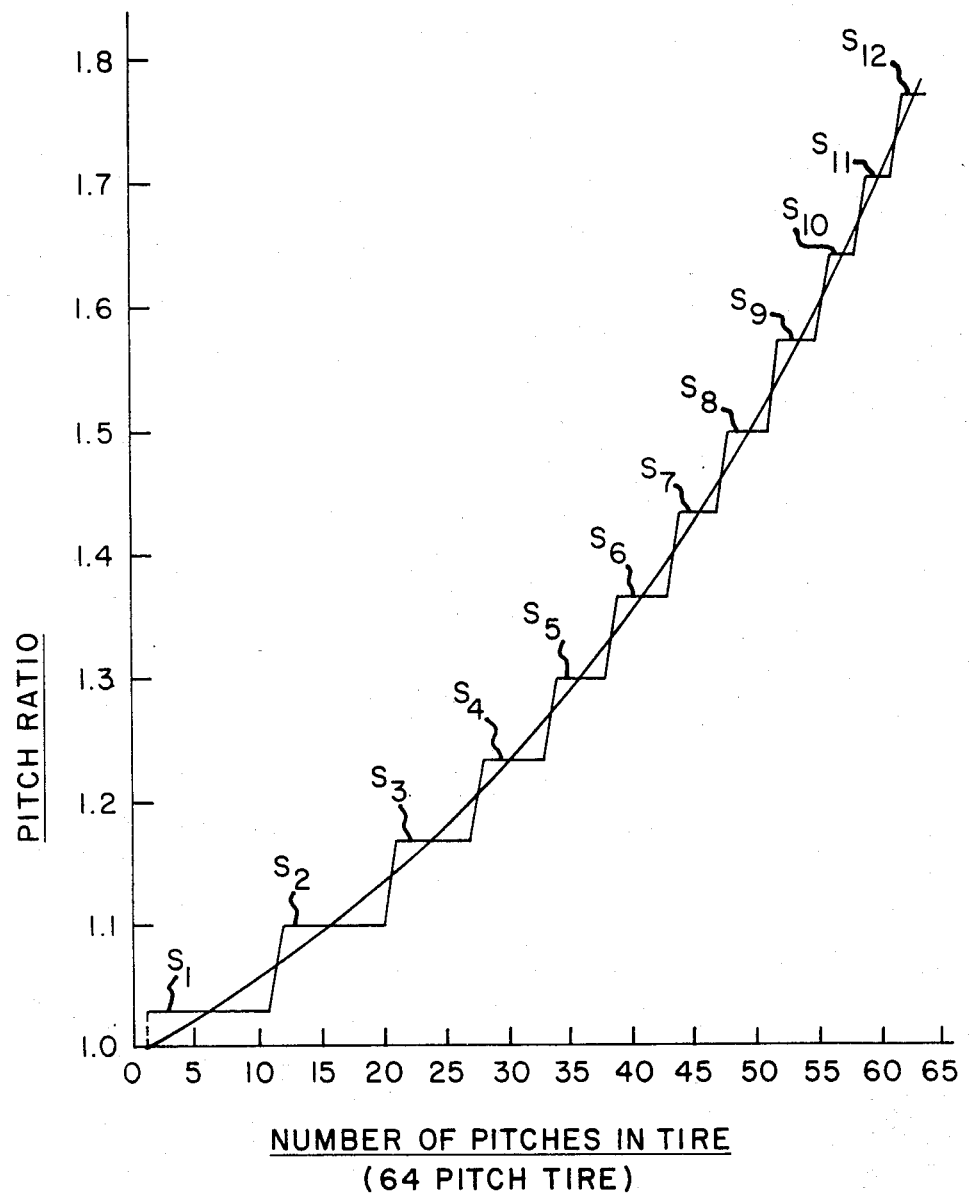
FIG. 5 illustrates a graphical representation of an exponential progression plotted as pitch ratio in function of the number of pitches in the tire.

The pitch ratios follow a curve substantially within the boundary represented by curves L and P and preferably substantially between A and E and most preferably between the mathematical progressions represented by equations G and E. The relationship illustrated in FIG. 4 is such that there may be as many different pitch ratios as there are pitches in the tire. However, as previously discussed, if the tire is provided with a large number of different pitches, the difference between the pitches could be very small and generally impractical to make. Therefore, the tread is generally provided with a number of different pitch lengths less than the total number of pitches. The pitches are grouped together as previously discussed with at least 8 different pitches. The curve illustrated in FIG. 4 will of course vary for any given tire tread in accordance with the number of pitches and the ratio of the largest pitch length to that of the smallest pitch length which have been selected for that tire. Referring to FIG. 5, there is illustrated a tire having 64 pitches and a ratio largest/smallest pitch length of 1.8. The solid line represents the progression of equation E of FIG. 4. Equation E can be closely approximated by a step function, having twelve (12) steps (12 different pitch lengths) $S_1, S_2, S_3, S_4, S_5, S_6, S_7,$ $S_8, S_9, S_{10}, S_{11}$ and $S_{12}$ respectively. The first step $S_1$ indicates the ratio of the smallest pitch length of the design cycles and the number of pitches having this pitch ratio. The axial length is such that it extends a whole number of pitches. That is for step $S_1$, the axial length indicates that there would be eleven (11) pitches having the same ratio $V_1$, the ratio $V_1$ being 1.03 times the smallest pitch. For example, if the ratio largest/smallest pitch length was 1.8 and the smallest theoretical pitch length was 1.0 inches, the largest pitch length would be 1.8 inches. Thus the actual length $L_1$ of each pitch of step $S_1$ would be 1.03 inches [1.03 (pitch ratio)×1.0 (smallest theoretical pitch length)]. Likewise the pitch length of each of the pitches of step $S_2$ would be 1.099 inches and step $S_2$ would have 9 pitches. In this manner, the length of each pitch for each of the steps and the number of pitches for each step can be readily determined.

In the particular embodiment illustrated, the actual pitch length L for each step was determined using the following relationship:

$$L_i = \frac{V_i}{\Sigma P_i V_i} \cdot C$$

wherein $L_i$ is the pitch length for any given step;
$V_i$ is the pitch ratio;
$P_i$ is the number of pitches having the pitch ratio $V_i$;
C is the circumference of the tire;
$\Sigma P_i V_i$ is the summation of all the different pitch ratios times the number of pitches (design cycles) having that ratio.

As previously noted, the size of the tire illustrated is 185/70R14. The circumference of the tire is 1954.07 mm and the $\Sigma P_i V_i$ is 83.495. From this the length of each different pitch can be readily determined. The following chart provides the calculated pitch length for each step;

| Step | Pitch ratio ($V_i$) | Length of Each Pitch ($L_i$) | Number of Pitches For Each Step ($P_i$) |
|---|---|---|---|
| $S_1$ | 1.03 | 24.09 mm | 11 |
| $S_2$ | 1.099 | 25.78 mm | 9 |
| $S_3$ | 1.168 | 27.22 mm | 7 |
| $S_4$ | 1.234 | 28.91 mm | 6 |
| $S_5$ | 1.299 | 30.35 mm | 5 |
| $S_6$ | 1.366 | 32.04 mm | 5 |
| $S_7$ | 1.433 | 33.49 mm | 4 |
| $S_8$ | 1.50 | 35.17 mm | 4 |
| $S_9$ | 1.573 | 36.86 mm | 4 |
| $S_{10}$ | 1.642 | 38.30 mm | 3 |
| $S_{11}$ | 1.707 | 39.99 mm | 3 |
| $S_{12}$ | 1.776 | 41.43 mm | 3 |
| | | Total | 64 pitches |

In the embodiment illustrated in FIG. 5, the vertical height between each step S is substantially equal, however, the present invention is not limited to such. The step may be selected in any desired manner so long as the theoretical curve is clearly approximated by the step function selected. The steps are drawn so that the pitch length for each step does not vary by more than about 3% from the theoretical pitch length, preferably no greater than about 2%. It can be seen from the foregoing that the subject invention may be applied to any tire size or type of tire which has a repeating design pattern in the tread portion. Further the subject invention may be adapted to a variety of desired pitch ratios and number of pitches.

Certain representative embodiments and details have been shown for the purposes of illustrating the invention, it should be apparent to those skilled in the art that various changes and modifications may be made therein without departing from the scope of the present invention.

I claim:

1. A pneumatic tire having a ground-engaging tread portion comprising a plurality of repeating design cycles disposed circumferentially adjacent each other about the circumference of said tire, said repeating design cycles having at least eight different lengths, said design cycles being disposed about the circumference of said tire such that at least 60% of all design cycles having the same pitch length are disposed circumferentially adjacent each other, the different design cycle lengths are such that the pitch ratio of each of the different design cycle lengths follow a mathematical relationship with the boundry conditions as set by the following two relationships:

$$V_i = V_1 + \text{Log}\left[1 + (10-1)\frac{i-1}{N-1}\right](V_N - V_1) \quad (1)$$

$$V_i = V_1 + \left(\frac{i-1}{N-1}\right)^2 (V_N - V_1) \quad (2)$$

wherein
$V_1$ is the smallest pitch ratio;
$V_N$ is the largest pitch ratio;
N equals the number of pitches in the tire;
$V_i$ is the pitch ratio of each of the pitches that have to be determined, the subscript i indicating which pitch of the total number of pitches is being determined.

2. A tire according to claim 1 further characterized in that the different design cycle lengths are such that the pitch ratio for each design cycle length follow a mathematical relationship with the boundary conditions set by the following two relationships:

$$V_i = V_1 + \frac{i-1}{N-1} \cdot (V_N - V_1) \quad (1)$$

$$V_i = V_1 + \frac{e^{\frac{i-1}{N-1}}}{e-1} \cdot (V_N - V_1) \quad (2)$$

wherein
$V_1$ is the smallest pitch ratio;
$V_N$ is the largest pitch ratio;
N equals the number of pitches in the tire;
$V_i$ is the pitch ratio of each of the pitches that have to be determined, the subscript i indicating which pitch of the total number of pitches is being determined.

3. A tire according to claim 1 further characterized in that the different design cycle lengths are such that the pitch ratio for each design cycle length follow a mathematical relationship with the boundry conditions set by the following two relationships:

$$V_i = V_1 + \frac{e^{\frac{i-1}{N-1}} - 1}{e-1} \cdot (V_N - V_1)$$

wherein
$V_1$ is the smallest pitch ratio;
$V_N$ is the largest pitch ratio;
N equals the number of pitches in the tire;
$V_i$ is the pitch ratio of each of the pitches that have to be determined, the subscript i indicating which pitch of the total number of pitches is being determined.

4. A pneumatic tire according to claim 1 further characterized by said repeating design cycle having at least ten (10) different lengths.

5. A pneumatic tire according to claim 1 further characterized by said repeating design cycles having twelve (12) different lengths.

6. A pneumatic tire according to claim 1 further characterized by said design cycles being disposed about the circumference of said tire such that at least 80% of all design cycles having the same length are circumferentially adjacent each other.

7. A pneumatic tire according to claim 1 further characterized by said design cycles being disposed about the circumference of said tire such that substantially all of said design cycles having the same pitch length are disposed circumferentially adjacent each other.

8. A pneumatic tire according to claim 1 further characterized by said design cycles having a ratio of the largest design cycle length to the smallest design cycle length in the range of 1.2 to 1.8.

* * * * *

UNITED STATES PATENT AND TRADEMARK OFFICE
CERTIFICATE OF CORRECTION

PATENT NO. : 4,503,898
DATED : March 12, 1985
INVENTOR(S) : LEO J. HITZKY

It is certified that error appears in the above-identified patent and that said Letters Patent is hereby corrected as shown below:

In Column 5, line 24, delete "boundry" and insert -- boundary -- .

In Column 5, between lines 25 and 30, the mathematical relationship should read as follows:

$$V_i = V_1 + \text{Log}\left[1 + (10 - 1)\cdot\frac{i-1}{N-1}\right]\cdot(V_N - V_1)$$

In Column 5, between lines 30 and 35, the mathematical relationship should read as follows:

$$V_i = V_1 + \left(\frac{i-1}{N-1}\right)^2\cdot(V_N - V_1)$$

In Column 6, between lines 1 and 5, the mathematical relationship should read as follows:

$$V_i = V_1 + \frac{e^{\frac{i-1}{N-1}} - 1}{e - 1}\cdot(V_N - V_1)$$

Signed and Sealed this

Second Day of September 1986

[SEAL]

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,503,898

DATED : March 12, 1985

INVENTOR(S) : Leo J. Hitzky

It is certified that error appears in the above-identified patent and that said Letters Patent is hereby corrected as shown below:

Column 6, line 17, "boundry" should read -- boundary --.

Signed and Sealed this

Nineteenth Day of January, 1988

Attest:

DONALD J. QUIGG

Attesting Officer  Commissioner of Patents and Trademarks